United States Patent
Cen et al.

(10) Patent No.: US 10,474,985 B2
(45) Date of Patent: Nov. 12, 2019

(54) AUTOMATON-BASED FRAMEWORK FOR ASSET NETWORK ROUTING

(71) Applicant: SAP SE, Walldorf (DE)

(72) Inventors: Yuanyuan Cen, Shanghai (CN); Yingbin Zheng, Shanghai (CN); Yan Tan, Shanghai (CN); Honggang Wang, Shanghai (CN); Philippe Nemery, Shanghai (CN); Xingtian Shi, Shanghai (CN); Irene Chen, Shanghai (CN); Terry Wang, Shanghai (CN); Mark Finch, Walnut Creek, CA (US)

(73) Assignee: SAP SE, Walldorf (DE)

( * ) Notice: Subject to any disclaimer, the term of this patent is extended or adjusted under 35 U.S.C. 154(b) by 1182 days.

(21) Appl. No.: 14/459,262

(22) Filed: Aug. 13, 2014

(65) Prior Publication Data

US 2016/0048803 A1 Feb. 18, 2016

(51) Int. Cl.
*G06Q 10/08* (2012.01)

(52) U.S. Cl.
CPC ....... *G06Q 10/08355* (2013.01); *G06Q 10/08* (2013.01); *G06Q 10/083* (2013.01)

(58) Field of Classification Search
CPC . G06Q 10/08; G06Q 10/083; G06Q 10/08355
See application file for complete search history.

(56) References Cited

U.S. PATENT DOCUMENTS

| | | | | |
|---|---|---|---|---|
| 6,381,538 B1* | 4/2002 | Robinson | ............... | G01C 23/00 701/439 |
| 6,665,648 B2* | 12/2003 | Brodersen | ............ | G05B 19/042 705/1.1 |
| 7,246,056 B1* | 7/2007 | Brewton | ............. | G06F 17/5009 703/20 |
| 7,660,732 B2* | 2/2010 | Malitski | ............... | G06Q 10/047 705/338 |
| 9,146,120 B2* | 9/2015 | Wan | .................... | G01C 21/3446 |
| 9,558,468 B2* | 1/2017 | Donlan | ................. | G06Q 50/28 |
| 9,726,502 B2* | 8/2017 | Ni | .......................... | G01C 21/20 |
| 9,778,051 B2* | 10/2017 | Vo | ...................... | G01C 21/3423 |

(Continued)

OTHER PUBLICATIONS

Boyan, Justin, and Michael Mitzenmacher. "Improved results for route planning in stochastic transportation." Proceedings of the twelfth annual ACM-SIAM symposium on Discrete algorithms. Society for Industrial and Applied Mathematics, 2001.*

(Continued)

*Primary Examiner* — Asfand M Sheikh
(74) *Attorney, Agent, or Firm* — Klarquist Sparkmna, LLP

(57) ABSTRACT

A rule handler may receive a first routing rule and a second routing rule, each routing rule characterizing at least one potential physical transportation route. A rule converter may convert the first routing rule and the second routing rule into a first finite automaton (FA) and a second finite automaton, respectively, and may combine the first finite automaton and the second finite automaton into a finite automaton network graph. A graph comparator may then compare the finite automaton network graph to existing physical transportation routes, and a route selector may select, based on the comparing, at least one feasible physical transportation route from the existing physical transportation routes, the at least one feasible physical transportation route being an instance of the at least one potential physical transportation route.

20 Claims, 16 Drawing Sheets

(56) References Cited

U.S. PATENT DOCUMENTS

| | | | |
|---|---|---|---|
| 2007/0130174 A1* | 6/2007 | Ramesh | G06Q 10/06316 |
| 2008/0209029 A1* | 8/2008 | Bhattacharya | G06Q 10/06 709/224 |
| 2008/0275643 A1* | 11/2008 | Yaqub | G01C 21/343 701/412 |
| 2008/0306795 A1* | 12/2008 | Ho | G06Q 10/047 705/7.26 |
| 2010/0071057 A1* | 3/2010 | Plache | G05B 19/045 726/17 |
| 2011/0301840 A1* | 12/2011 | Wang | G01C 21/26 701/425 |
| 2012/0173135 A1* | 7/2012 | Gutman | G01C 21/343 701/408 |
| 2012/0226624 A1* | 9/2012 | Song | G06Q 10/083 705/338 |
| 2012/0235791 A1* | 9/2012 | Donlan | G06Q 10/08 340/10.1 |
| 2013/0159208 A1* | 6/2013 | Song | G06Q 50/28 705/338 |
| 2013/0317742 A1* | 11/2013 | Ulloa Paredes | G06Q 10/063 701/533 |
| 2017/0176198 A1* | 6/2017 | Tatourian | G01C 21/3453 |

* cited by examiner

AUTOMATON-BASED FRAMEWORK FOR ASSET NETWORK ROUTING

TECHNICAL FIELD

This description relates to asset network routing.

BACKGROUND

Asset network routing refers to the physical transportation of goods across a geographical distance, from a starting location to a destination location, including any intermediate locations and routes travelled. Acceptable or optimal solutions to a particular network asset routing problem are subject to resource availability concerns. For example, for a route to be planned between two locations, it is possible that specific modes of transport (e.g., by land using truck or rail, by air, or by sea) may or may not be available, or may be available only at certain scheduled times.

Moreover, resources may vary in availability among shorter, intermediate distances within the overall route to be planned. For example, it may be possible to complete a first segment of a route between the starting location and an intermediate location only by air or by sea, while a second segment of the route between the intermediate location and the destination may be completed only by truck or rail. Alternate intermediate segments may or may not be available, and may or may not offer acceptable alternative resources for completing the asset network routing plan.

Meanwhile, certain aspects of network routing inherently include or reflect underlying business-related routing concerns. For example, one item transported between locations might be foodstuff that requires, e.g., refrigeration or compliance with food safety regulations. Meanwhile, a second item transported between the same two locations might not have any such restrictions or concerns, but may be extremely heavy, or, in other cases, extremely fragile.

Therefore, business concerns for a particular asset network routing scenario might include a manner of transportation (e.g., by land using truck or rail, by air, or by sea), and, within those choices, more specific choices might be required (such as using a food-compatible truck as compared to a non-food compatible truck). Moreover, such choices will have an impact on a cost of the transportation, as well the timing of the delivery (e.g., both a start time and a delivery time of the delivery). Other concerns, such as capacity concerns, also may be important or decisive, since, for example, it may be impossible to make certain deliveries using a particular mode of transport, or to or through a particular location, if that transport mode or location is not physically or administratively able to manage the relevant size (e.g., weight, volume, or number) of the delivery (such as when a harbor is not able to receive shipments of a certain size arriving by sea). Still further, choices in network asset routing may be impacted by other business concerns, such as existing business relationships with certain carriers, or service level guarantees offered by specific vendors.

SUMMARY

The present description provides techniques for solving asset network routing problems in a convenient, scalable manner. Specifically, business rules may easily be specified by users and captured, tested, modified, and deployed, potentially in multiple network asset routing scenarios. Individual business rules are captured and converted into finite automatons. Then, the finite automatons are combined to obtain a combined routing solution. At this stage, it is straightforward to determine any infeasibilities or contradictions in the combined business rules that may require correction. Then, feasible geographical routes may be retrieved, based on the combined routing solution, to obtain a final asset network route for a particular delivery. In this way, the final asset network route is obtained easily, efficiently, and reliably. Moreover, the received business rules (expressed as the combined finite automatons) may be saved and used in the future to consider, test, and ultimately deploy new asset network routing solutions in other contexts (e.g., future deliveries between the same start/destination locations).

According to one general aspect, a system includes at least one processor, and instructions recorded on a non-transitory computer-readable medium, and executable by the at least one processor. The system may include a rule handler configured to receive a first routing rule and a second routing rule, each routing rule characterizing at least one potential physical transportation route, and a rule converter configured to convert the first routing rule and the second routing rule into a first finite automaton (FA) and a second finite automaton, respectively, and further configured to combine the first finite automaton and the second finite automaton into a finite automaton network graph. The system also may include a graph comparator configured to compare the finite automaton network graph to existing physical transportation routes, and a route selector configured to select, based on the comparing, at least one feasible physical transportation route from the existing physical transportation routes, the at least one feasible physical transportation route being an instance of the at least one potential physical transportation route.

According to another general aspect, a computer-implemented method for executing instructions stored on a non-transitory computer readable storage medium may include receiving a first routing rule and a second routing rule, each routing rule characterizing at least one potential physical transportation route, and converting the first routing rule and the second routing rule into a first finite automaton and a second finite automaton, respectively. The method also may include combining the first finite automaton and the second finite automaton into a finite automaton network graph, comparing the finite automaton network graph to existing physical transportation routes, and selecting, based on the comparing, at least one feasible physical transportation route from the existing physical transportation routes, the at least one feasible physical transportation route being an instance of the at least one potential physical transportation route.

According to another general aspect, a computer program product may be tangibly embodied on a non-transitory computer-readable storage medium and include instructions that, when executed, are configured to cause at least one processor to receive a first routing rule and a second routing rule, each routing rule characterizing at least one potential physical transportation route, and convert the first routing rule and the second routing rule into a first finite automaton and a second finite automaton, respectively. The instructions, when executed, may be further configured to cause the at least one processor to combine the first finite automaton and the second finite automaton into a finite automaton network graph, compare the finite automaton network graph to existing physical transportation routes, and select, based on the comparing, at least one feasible physical transportation route from the existing physical transportation routes, the at least one feasible physical transportation route being an instance of the at least one potential physical transportation route.

The details of one or more implementations are set forth in the accompanying drawings and the description below. Other features will be apparent from the description and drawings, and from the claims.

DETAILED DESCRIPTION

Figure 1:
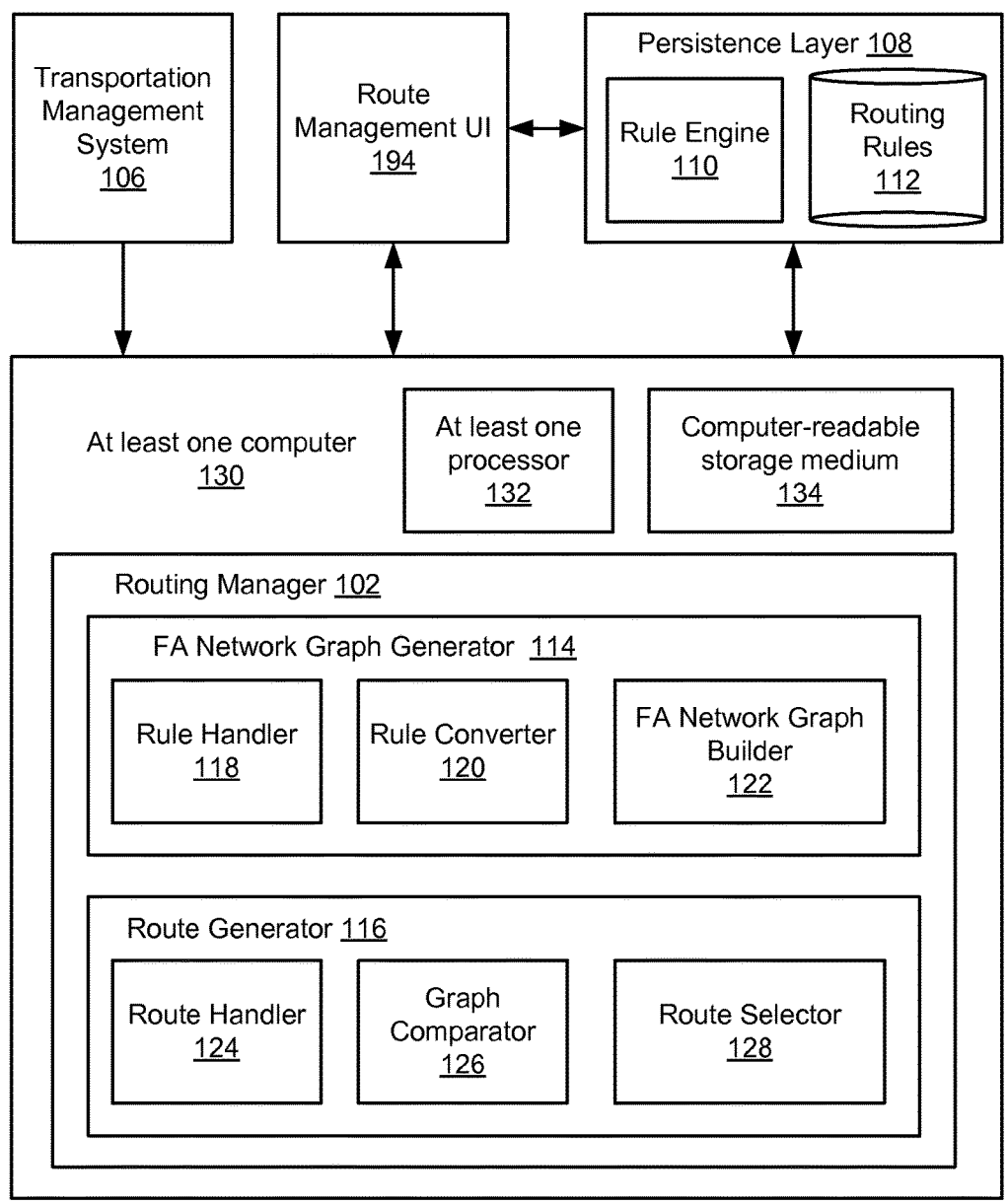
FIG. 1 is a block diagram of a system for an automaton-based solution for asset routing.

FIG. 1 is a block diagram of a system 100 for an automaton-based solution for asset routing. In the example of FIG. 1, a routing manager 102 utilizes a route management user interface (UI) 104 and access to a transportation management system 106 to generate feasible physical transportation routes for asset shipments.

In more detail, a persistence layer 108 may provide a rule engine 110 that receives user input, by way of the route management UI 104, characterizing a desired type of shipment. In this way, as described in detail below, routing rules associated with a shipment type may be formulated without requiring, at a time of a formulation, knowledge of identified, specific start and end locations to be associated with shipments of the shipment type. Instead, the formulated routing rules, or variations thereof, stored within routing rules repository 112, may be used to identify feasible physical transportation routes for any shipment instance of the specified shipment type.

During operation, the routing manager 102 may execute a finite automaton (FA) network graph generator 114, which is generally configured to receive appropriate ones of the routing rules 112 for a corresponding shipment type, convert the received, relevant routing rules into corresponding finite automata, and, finally, combine the converted finite automata into a single FA network graph. Then, when provided with at least a start and end destination to be associated with at least one shipment instance of the shipment type, a route generator 116 of the routing manager 102 may be configured to retrieve potential physical transportation routes for the shipment instance from the transportation management system 106, for comparison against the FA network graph of the FA network graph generator 114. Based on this comparison, the route generator 116 may thus provide one or more feasible physical transportation routes to be used during a routing of a particular instance of the shipment type for which the relevant routing rules 112 were originally formulated.

In more detail, the FA network graph generator 114 is illustrated as including a rule handler 118, which may be configured to receive corresponding routing rules for an identified shipment type, as received by way of the route management UI 104. As referenced above, and described in detail below, such routing rules of the routing rules repository 112 may include requirements, constraints, and other characterizations of potential physical transportation routes that may be suitable for executing shipment instances of the corresponding shipment type. For example, such routing rules may specify a minimum or maximum weight for shipment instances of the shipment type, a maximum amount of time required for completion of shipment instances of the shipment type, and any specialized shipment requirement for shipment instances of the shipment type (e.g., requirements for food safety and spoilage prevention, or requirements for shipping hazardous materials).

Additional examples of potential routing rules for a given shipment type are provided below, e.g., with respect to FIG. 3. However, it may generally be appreciated that the routing rules characterize a manner in which shipment instances of the shipment type will be conducted, including, for example, consideration of available shipping resources, characterization of available modes of transport (e.g., land, sea, or air), or any restriction on a number of route segments that are required or permitted to be used.

For example, for a shipment type of fresh fruit, routing rules may be formulated with respect to a maximum duration of time of permitted shipment instances, a required level of refrigeration, and a maximum number of segment junctions at which unloading and reloading of the fresh fruit might occur. Further, routing rules may reflect restrictions on a maximum quantity or weight of the fresh fruit to be shipped, while also specifying restriction or requirement for potential start, intermediate, and/or finish destinations through which shipment instances may travel.

Once the routing rules 112 are formulated, the rules handler 118 may retrieve relevant ones of the routing rules, and a rule converter 120 may proceed to convert each of the routing rules to a corresponding finite automaton. In this regard, it may be appreciated that a finite automaton, also referred to herein as a Deterministic Finite Automaton is a type of state machine in which a plurality of potential states are connected by transitions defining permitted or required conditions for advancing from a state at a beginning of the transition to a subsequent state at the end of the transition.

Finite automata are particularly advantageous in the context of the system 100 of FIG. 1, because they allow for representation of potential or actual cities or other locations as nodes, connected by transitions associated with a path between a corresponding pair of, e.g., cities, represented as nodes, where a transition between two nodes thus represents a transportation path between the two represented geographic locations. In this way, each such transition also may be associated with one or more requirements, constraints, or other conditions characterizing the physical transportation path represented by the transition. Examples of such finite automata are provided below, e.g., with respect to FIGS. 6 and 7.

Once the rule converter 120 has converted each routing rule into a corresponding finite automaton, a FA network graph builder 122 may proceed to combine all of the finite automata received from the rule converter 120, to thereby obtain an FA network graph representing the combination of all of the finite automata associated with the routing rule in question. Details of example operations of the FA network graph builder 122 are provided below, e.g., with respect to FIGS. 8-12. In general, however, it may be appreciated that the operations of the FA network graph builder 122 in combining relevant finite automata represents potential physical transportation routes, without requiring identification, at this stage, of any particular or specific geographical locations.

Thus, it may be appreciated that, once obtained, the combined FA network graph provided by the FA network graph builder 122 may be persisted within the persistence layer 108, e.g., in association with the routing rules repository 112. Then, the persisted FA network graph is available to be instantiated at a current or later time, with respect to specific shipment instances of the shipment type with respect to which the FA network graph was constructed.

For example, for a shipment type of fresh fruit having associated routing rules formulated with respect thereto, as described above, a FA network graph may be constructed and persisted. At a later time, parameters for a desired shipment instance of the shipment type may be received, including, for example, specific geographic locations for start and end locations of the desired shipment instance.

Consequently, it may be appreciated that the FA network graph for the shipment type may be instantiated multiple times, for multiple shipment instances. For example, the same FA network graph may be instantiated for a first shipment instance between a first pair of cities, and may later be instantiated again for a second shipment instance between a second pair of cities. Moreover, even if the persisted FA network graph does not match exactly with respect to a desired shipment instance, the FA network graph generator 114 may be utilized to make necessary modifications to the FA network graph, for conformance thereof to the desired shipment instance. Consequently, it is not necessary to construct entirely new FA network graphs for new shipment types and shipment instances. Rather, existing FA network graphs for existing shipment types may be modified as needed to meet a current demand. Similarly, the formulated FA network graph may be modified on a prospective or speculative basis, in order to consider potential variations on available shipment types, also referred to as "what if" analysis.

In order to execute a desired instantiation of a generated FA network graph, parameters for a desired shipment instance may be received in a route handler 124 of the route generator 116. For example, the route management UI 104 may be configured to receive shipment instance parameters, such as, as referenced above, identified geographical locations (e.g., cities) representing start and end destinations for the desired shipment instance. Of course, other types of shipment instance parameters also may be included, as described in more detail below, e.g., with respect to FIG. 5.

Once the shipment instance parameters are received, the route handler 124 may proceed to select all available, potential physical transportation routes corresponding to the shipment instance parameters from the transportation management system 106. For example, for a desired shipment instance between a first city and a second city, the route handler 124 may retrieve a first physical transportation path that includes a particular interstate highway, a second physical transportation path that includes an alternate interstate highway, and a third physical transportation path that includes an available railway between the first city and the second city.

Then, a graph comparator 126 may be configured to compare the FA network graph for the shipment type with the available physical transportation routes associated with the desired shipment instance, to thereby obtain potentially feasible physical transportation routes. In other words, the combined graph provided by the graph comparator 126 represents potentially feasible physical transportation routes in the sense that each pair of nodes and intervening transition complies with the relevant FA network graph, and with the relevant potential physical transportation path provided by the route handler 124. Notwithstanding, and as illustrated and described in detail below, it may occur that a given pair of nodes and intervening transition is not itself included within an overall, larger physical transportation route that connects the specified start destination with the specified end destination (e.g., a given pair of nodes and intervening transition may represent a dead end).

Consequently, a route selector 128 may be configured to examine the combined network graphs provided by the network graph comparator 126, and may reduce the combined graph by removing pairs of nodes and associated transition that are representative of dead ends, or otherwise representative of non-feasible physical transportation paths. In this way, one or more feasible physical transportation paths or routes may be provided by way of the route management UI 104, whereupon a user of the route management UI may select and implement a desired one of the provided feasible physical transportation routes.

As may be appreciated from the above, and as described in more detail below, the automaton-based solution of the system 100 of FIG. 1 provides a number of features and advantages. For example, the system 100 enables straightforward, convenient formulation of business related routing rules, without requiring current or advance knowledge of the actual geographical locations associated therewith. Instead, as described, the routing rules may be formulated for corresponding shipment types, and may be instantiated for particular shipment instances, or variations thereof, on an as-needed basis.

Moreover, by formulating the automaton-based network graph provided by the FA network graph generator 114, it is possible to detect inconsistencies and contradictions with the specified routing rules. Thus, not only are such potential difficulties identified in a reliable manner, identification occurs at an early stage in the process, so that corrections may be made prior to a large scale deployment of actual physical transportation paths and associated shipments. Various other features and advantages of the system 100, and variations thereof, are provided in more detail below, or would be apparent.

In the example of FIG. 1, the routing manager 102 is illustrated as being implemented using at least one computer 130, which itself includes at least one processor 132 and computer readable storage medium 134. That is, for example, the at least one computer 130 should be understood to potentially represent two or more computers, communicating by way of intervening computer network, and each including some portion of the routing manager 102.

In this regard, it may be appreciated that, although the routing manager 102 is illustrated as including a plurality of separate, distinct components, alternate implementations may be utilized in which any two or more of the illustrated components are combined for execution as a single component. Conversely, in still other implementations, any illustrated component may be divided for execution as two or more subcomponents.

Further, although the at least one computer 130 is illustrated as executing the routing manager 102 separately from other components of the system 100, it may be appreciated that, in other implementations, this may not be the case. For example, the at least one computer 130 may be utilized to implement the persistence layer 108, as well as the transportation management system 106.

Similarly, the route management UI 104 may be provided by the at least one computer 130, or, in other implementations, may be provided remotely at a client computer. Meanwhile, the at least one processor 132 should be understood to represent, in some implementations, two or more processors executing in parallel to execute instructions recorded on the non-transitory computer readable storage medium 134, and thereby provide the routing manager 102. In this regard, it may be appreciated that the at least one processor 132 may represent any suitable current or future processor capable of executing the instructions recorded on the non-transitory computer readable storage medium 134 to provide the routing manager 102. Similarly, the non-transitory computer readable storage medium 134 may represent any suitable computer memory capable of storing the reference instructions, as well as, additionally or alternatively, a suitable computer memory capable of storing data stored and/or processed by the routing manager 102 (e.g., the routing rules 112 of the persistence layer 108).

Figure 2:
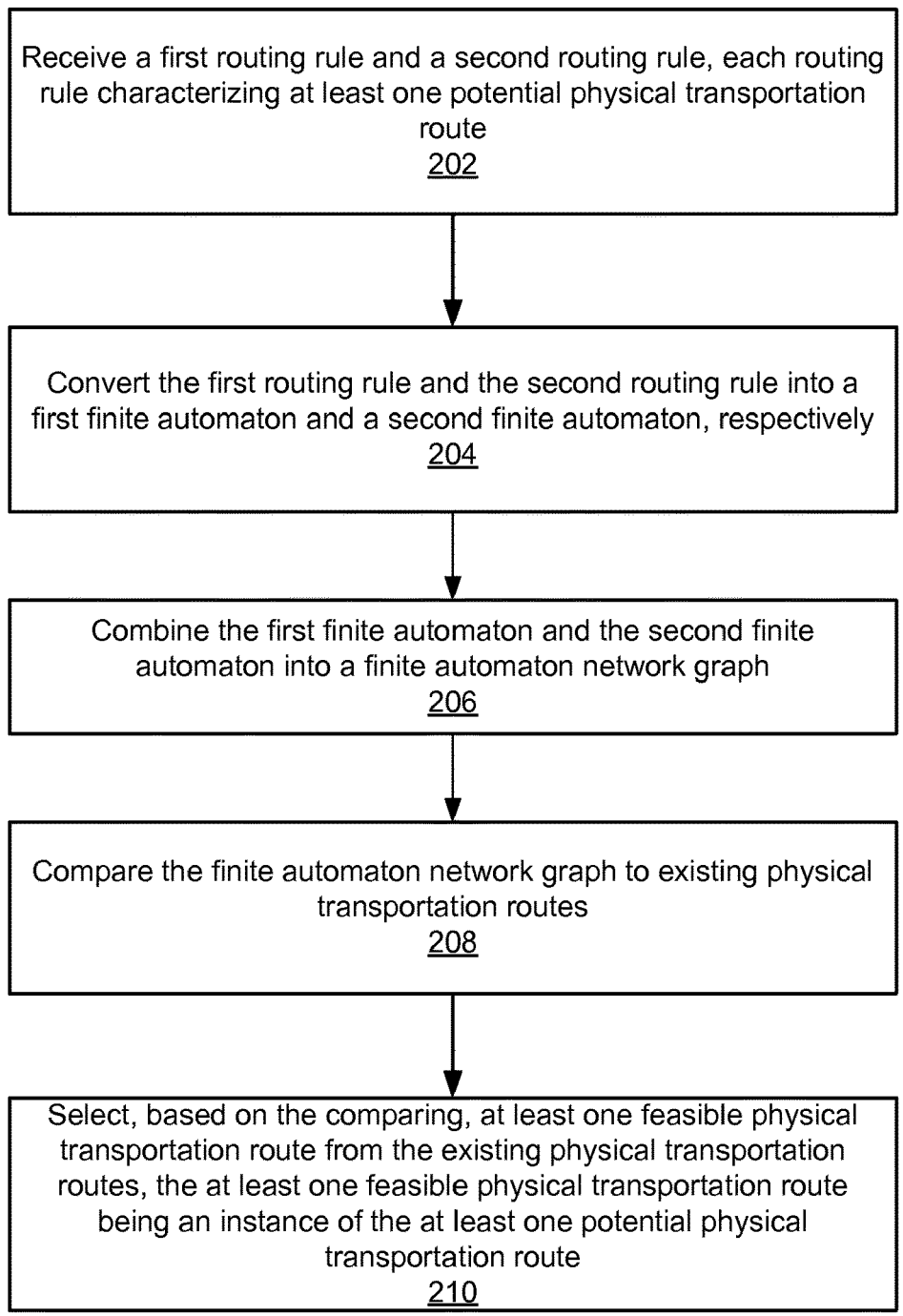
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. However, in other example implementations, additional or alternative operations or sub-operations may be included or substituted, and any two or more such operations or sub-operations may be executed in a parallel, nested, iterative, looped, or branched manner.

In FIG. 2, a first routing rule and a second routing rule are received, each routing rule characterizing at least one potential physical transportation route (202). For example, as described above, the rule handler 118 may receive routing rules characterizing a particular shipment type, independently of specific geographic location, as received from a user of the system 100 by way of the route management UI 104, and stored within the persistence layer 108.

The first routing rule and the second routing rule may be converted into a first finite automaton and a second finite automaton, respectively (204). For example, the rule converter 120 may convert the first and second routing rules into corresponding first and second finite automata. As referenced above, examples of such finite automatons are provided below, e.g., with respect to FIGS. 6 and 7.

The first finite automaton and second finite automaton may be combined into a finite automaton network graph (206). For example, the FA network graph builder 122 of FIG. 1 may combine the first and second finite automatons into a single finite automaton network graph, which may itself be stored within the persistence layer 108. As described above, the combined finite automaton network graph thus represents an extracted representation of available physical transportation routes represented by the at least one potential physical transportation route.

Then, the finite automaton network graph may be compared to existing physical transportation routes (208). For example, the route handler 124 may retrieve such existing physical transportation routes from the transportation management system 106 based on potential shipment instances of the shipment type for which the first and second routing rules were originally defined, including shipment instance parameters such as specified start and end destinations associated with a current shipment instance of the shipment type. Then, the graph comparator 126 may be configured to compare the thus-retrieved existing physical transportation route with the FA network graph provided by the FA network graph builder 122.

Based on the comparing, at least one feasible physical transportation route may be selected from the existing physical transportation routes, where the at least one feasible physical transportation route is an instance of the at least one potential physical transportation route (210). For example, the route selector 128 may determine at least one feasible physical transportation route that conforms to the first routing rule and the second routing rule, and thereby to the at least one potential physical transportation route, in as much as the first routing rule and the second routing rule are represented by, and included within, the finite automaton network graph. In this way, the at least one feasible physical transportation route may be provided for display within the route management UI 104, and for selection and use thereof by a user of the system 100. Consequently, such a user may quickly determine an actual, feasible physical transportation route for executing a particular shipment instance, with confidence that all associated requirements and constraints associated with the shipment instance will be met.

Thus, FIG. 2 represents a simplified view of basic features and functions of the system 100 of FIG. 1. As referenced, many additional or alternative operations or sub-operations may be included in various embodiments. In particular, for example, FIG. 2 refers to a first routing rule and a second routing rule, but in various embodiments, a large number of routing rules may be utilized. In particular, a set of such routing rules may be combined using, e.g., Boolean logic, including AND/OR logic. For example, in a scenario in which five rules, enumerated as Rule1-Rule5, are utilized, then the automaton combination approaches described in FIGS. 8-12 below may be used, e.g., to combine the five rules as: ((Rule1 OR Rule2) AND (Rule3 OR Rule4)) OR Rule5, to thereby generate a FA network and represent a complex rule, as described in detail, below.

Figure 3:
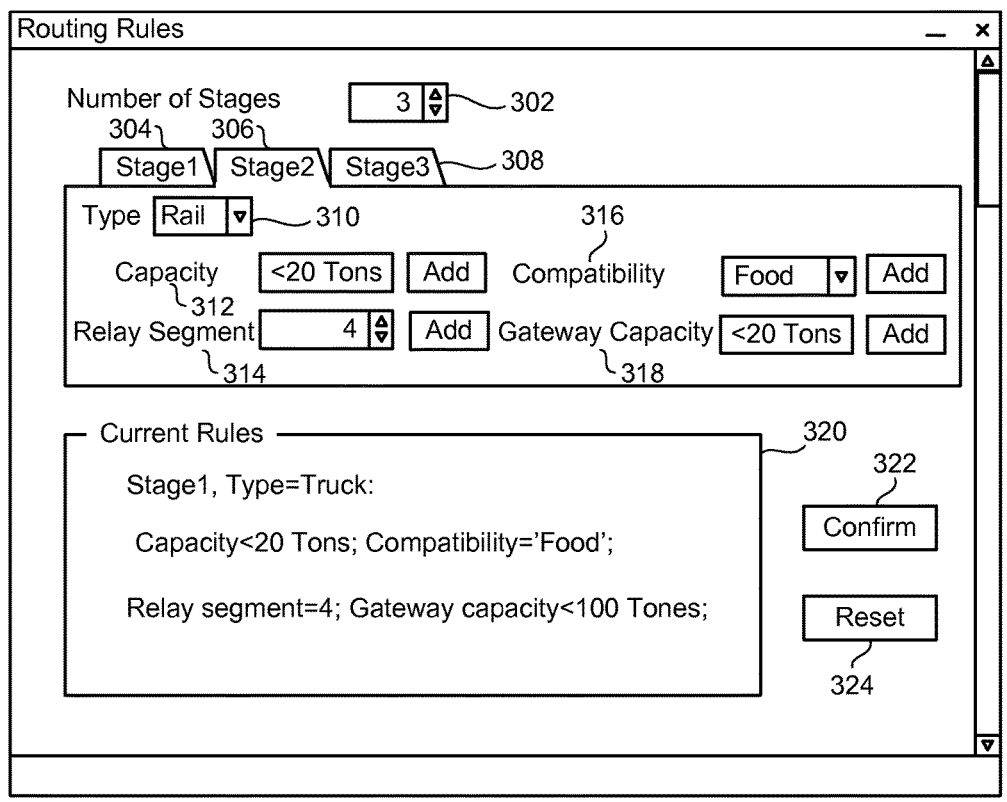
FIG. 3 is a screenshot of an example user interface that may be used by the system of FIG. 1.

FIG. 3 is a screenshot 300 illustrating an example implementation of the route management UI 104 of FIG. 1. As described, the route management UI 104 may be configured to receive routing requirements and constraints for a specified shipment type, to be stored as the routing rules 112 within the persistence layer 108.

Therefore, in the example of FIG. 3, a selection box 302 allows the user to select a maximum number of stages that may be experienced by shipment instances of the shipment type in question. That is, for example, it is sometimes advantageous or necessary to unload a shipment at the end of a first segment, and reload the shipment for transport through a second, subsequent segment. For example, a shipment arriving by sea may be unloaded at the dock, and reloaded within a truck or rail car. The use of such separate route segments may be advantageous.

For example, in order to reach destinations that may otherwise be unavailable, or to accomplish savings and cost or time, or for other strategic business reasons. However, for certain shipment types, it may be undesirable or unacceptable to exceed a maximum number of such routing stages. Again, reasons for such a constraint may vary depending on characteristics of the shipment type in question, but would presume to be apparent to a user of the system 100 having familiarity with the shipment type for which network routing's being performed.

Further in FIG. 3, as shown, the maximum number of stages selected is 3, so that tab 304, 306, 308 correspond to 3 such stages, respectively, of stage 1, stage 2, stage 3. In the example, stage 2 associated with the tab 306 is selected for receiving associated current routing requirements. As shown, a dropdown menu 310 enable selection of a type of transport, e.g., transport by rail, as illustrated. Then, a capacity rule 312 may enable the user to add a constraint that the shipments of the shipment type should be limited to a maximum weight of 2 tons.

A section 314 allows for specification of a number of relay rules, where such relay rules generally express conditions under which a connection between two schedules is allowed. A compatibility rule 316 may be added to specify characteristics with which shipments of the shipment type must comply, such as, in the example, compatibility with shipment of food items. Then, a gateway capacity rule 318 may refer to addition of a maximum allowable capacity that may be permitted at one of a predefined number of gateway cities or other gateway locations that are known to serve as hubs within the overall, larger transportation networks that may be available and included within the transportation management system 106.

A portion 320 may be included to summarize current rules that have already been received, e.g., in conjunction with the tab 304 stage 1. As shown, similar routing rules may already have been assigned with respect thereto. As demonstrated, many such routing rules will be the same or similar as routing rules assigned for stage 2 in the tab 306. For example, capacity, gateway capacity and relay segments may be the same, and food compatibility would of course be required for each stage, as well. However, as also shown, the type of transportation may have been different in the previous stage, and, in the example of FIG. 3, is illustrated as having been configured as a transportation type including shipment by truck. Also in FIG. 3, a confirm button 322 allows the user to confirm selections already entered, to thereby move onto a subsequent stage for entry of further routing rules in conjunction therewith. On the other hand, a reset button 324 may be selected to reset values of the screenshot 300 to default or original values.

Of course, the various routing rules illustrated with respect to FIG. 3 should be understood to be non-limiting example routing rules, and various additional or alternative aspects of the illustrated routing rules are contemplated as well, as well as entirely different routing rules. For example, capacity rules associated with a capacity rule 312 of FIG. 3 should be understood to more generally express any applicable maximum capacity associated with a specified route type. Such maximum capacities may be expressed in terms of weight, length, volume, or other physical characteristic, such as a maximum weight of 20 tons, or a maximum length of 40 feet.

Meanwhile, compatibility rules, such as compatibility rule 316 of FIG. 3, express capabilities between the shipment type in question and the available vehicles. Of course, in some cases, incompatibilities may exist, such as incompatibility between a container loaded with chemical products, which would not be compatible with a shipment type for food transport.

With regard to capacity rule 318, as referenced above, when leading or entering a geographic area, there are often a limited number of potential gateway locations. Such gateways often have pre-specified capacities, which may be denoted using the gateway capacity rule 318 of FIG. 3. Finally, with respect to relay rule 314, as referenced above, it may be appreciated that such relay rules generally express conditions under which a connection between two schedules is allowed, where the segment of the connection may be specified to be smaller than a threshold $T_R$ As just referenced, of course, many other different types of routing rules may be included. For example, in addition to transportation mode rules related to, e.g., specification of transportation mode such as railway, truck, ship, or airplane, more specific shipment rules may be included, such as shipment rules specifying an interstate, as compared to a highway, or an ordinary road.

In further examples, transportation constraint rules may specify maximum tolerable weight associated with one or more bridges to be traveled, or maximum height of included road overpasses. Similarly, rules may be expressed with respect to a total duration time of a transportation stage. In a final example, rules may be articulated with respect to requirements on drivers or other transport operators, such as required levels of certification.

Figure 4:
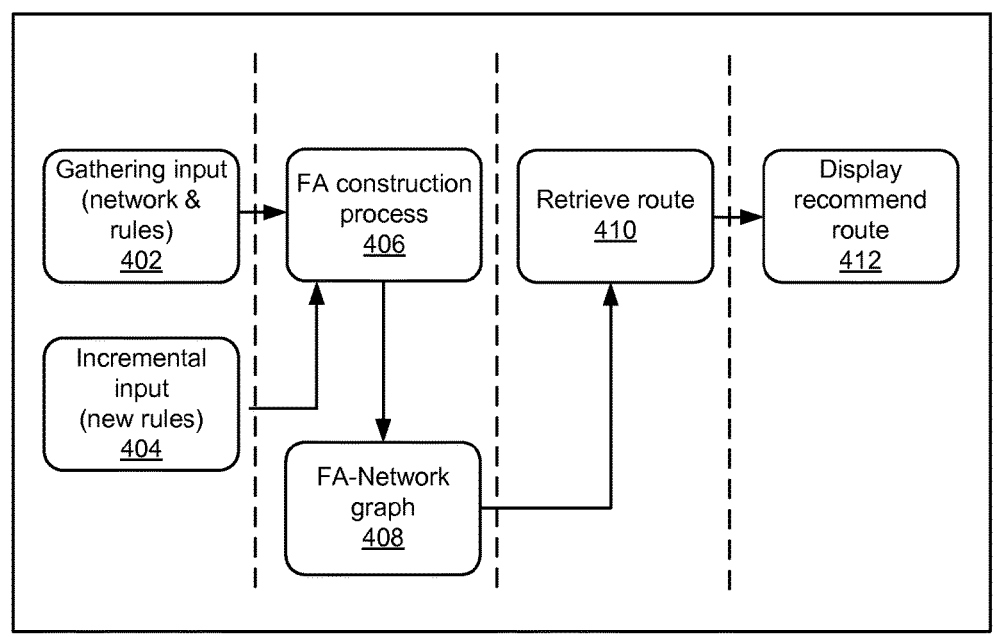
FIG. 4 is a block diagram illustrating a sequence of example operations of the system of FIG. 1.

FIG. 4 is a block diagram illustrating a sequence of operations executed by the system 100 of FIG. 1, in accordance with the example of the flowchart 200 of FIG. 2. Specifically, as shown, in a first stage, input is gathered (402), where such input may include the various routing rules obtained through the screenshot 300 of FIG. 3, as well as access to the transportation management system 106, and the available physical transportation routes included therein.

In a cold start, it is assumed that all such input are initially gathered. However, as referenced above, in a warm start in which a previous FA network graph has been constructed, incremental input (404) may additionally or alternatively be collected. For example, new rules modifying or replacing existing rules for a given shipment type, or variation thereof, may be collected by way of the screenshot 300 of FIG. 3.

Once all such rules and associated network information has been obtained, the FA construction process (406) may be executed. By this, as described, the rule converter 120 may convert routing rules obtained from the rule handler 118 into corresponding, respective finite automata. Then, the various finite automata may be combined into the single FA network graph, e.g., through execution of the FA network graph builder 122.

Then, available physical transportation routes for a specified shipment instance of the shipment type associated with the FA network graph may be retrieved (410). For example, as described, the route handler 124 may receive a start and end destination for a specific shipment instance, along with additional or alternative parameters for the shipment instance being proposed. The route handler 124 may use such shipment instance parameters to retrieve available physical transportation routes from the transportation management system 106.

Finally, a recommended route may be displayed (412), by comparing the retrieved available physical transportation path with the combined FA network graph, at the graph comparator 126, and the results of those comparisons may be utilized by the route selector 128 to identify actual, feasible physical transportation paths for the shipment instance in question that are included therein.

Figure 5:
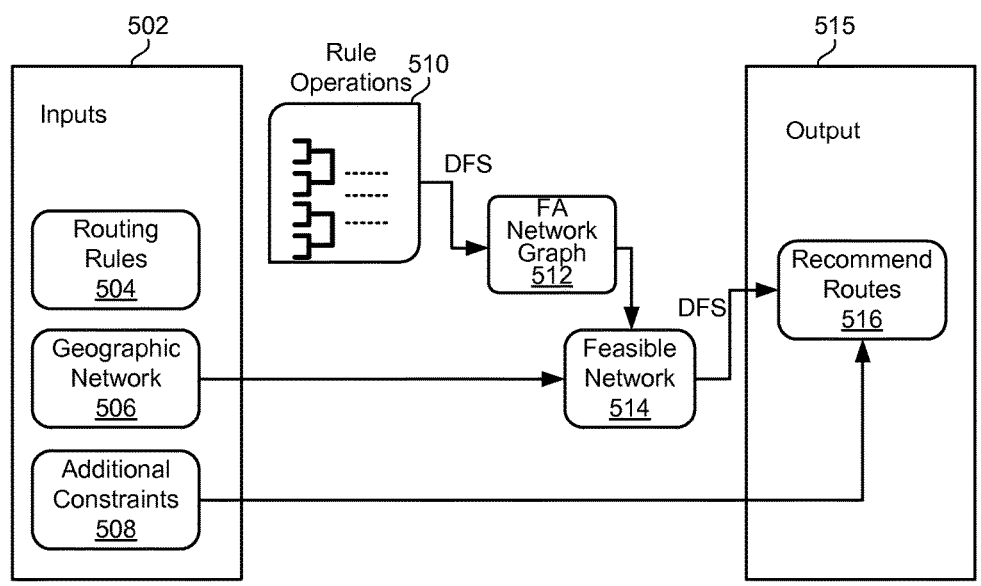
FIG. 5 is a block diagram illustrating an example framework used by the system of FIG. 1.

FIG. 5 is an alternate representation of a framework of the routing manager 102, in accordance with the sequence diagram of FIG. 4. As shown in FIG. 5, input 502 may include routing rules 504, available geographic network 506, and additional constraints 508, as described below.

As referenced above, the routing rules 504 may be converted into corresponding finite automata, to thereby facilitate application of rule operations 510, such as an OR operation or an AND operation, as described in detail below with respect to FIGS. 8-12. Through the use of such combination operations included within the rule operations 510, the various finite automata may be combined, and a scanning technique, such as the deep first scan (DFS) may be performed on the resulting combined network graph, to thereby obtain the FA network graph 512.

In this context, as described in more detail below, a DFS refers to a type of graph scan in which lowest leaf nodes of the graph are investigated, and a methodical process for checking each included node is followed. In this regard, it may be appreciated that various techniques associated with DFS are known, and are not therefore described herein in more detail, except as may be necessary or helpful in understanding operations of the system 100. Nonetheless, for purposes of understanding the example of FIG. 5, it should be appreciated that the DFS operation referenced therein is designed to remove nodes or branches of nodes that represent unacceptable outcomes within the context of the FA network graph 512, such as branches of nodes that do not reach a finish state of the FA network graph 512.

Then, by utilizing shipment instance parameters for a particular shipment instance, or group of shipment instances, the geographic network 506 may be accessed to provide potential feasible transportation networks. By comparing these against the FA network graph 512, at least one feasible network 514 may be determined. At this point, again, a scanning process, such as a DFS process, may be implemented to reduce states and associated transitions that should not be included, e.g., because they do not lead to a finish state corresponding to the specified destination location. In additional or alternative examples, known algorithms, such as Hopcroft's algorithm or Moore's algorithm for FA minimization.

Then, at a final output 515, recommended routes 516 may be provided, perhaps based on the additional constraints 508. For example, for a shipment type of 2 tons of fresh fruit, for which various routing rules have been received and utilized to create a corresponding FA network graph, a shipment instance specifying delivery between San Francisco and Phoenix may permit retrieval of available geographic networks existing between those two cities and matching the requirements and constraints expressed within the FA network graph. In this way, as just described, the feasible network 514 may be obtained. However, in such scenarios, the additional constraints 508 may represent constraints that apply specifically to the shipment instance in question, such as particular time limit requirements that may not apply in the context of the FA network graph as a whole. Thus, for example, the additional constraints 508 might include, individually, requirements or constraints that could themselves have been included within the routing rules 504, but did not apply to the shipment type as a whole. Nonetheless, in the framework of FIG. 5, such additional constraints may nonetheless be included as part of a recommendation process for selecting from among a plurality of the feasible networks 514.

As referenced above, a finite automaton is generally known to represent a type of finite state machine in which a new state is reached through a defined transition from a preceding state. In the system 100 of FIG. 1, as described, such a finite automaton may be implemented, in which each state represents a current or potential location of a shipment of assets, and each transition between each pair of states represents a requirement, constraint, or condition associated with transportation of the asset between the two locations represented by the linked states. In such uses of a finite automaton, the utilized finite automaton has the property of including a unique start or origin state, representing a location at which the asset shipment begins, as well as a unique finish or destination state, representing an end of the shipment of the asset in question. Thus, when defining, evaluating, or utilizing the finite automaton in the system 100 of FIG. 1, routes between the unique start state must be capable of reaching the unique finish state.

Figure 6:
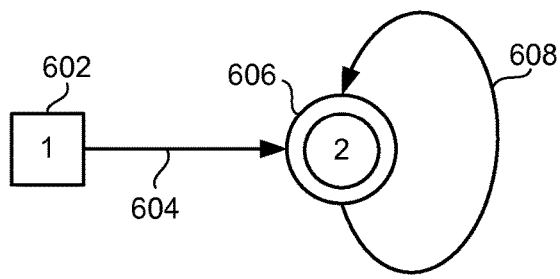
FIG. 6 is an example of a finite automaton used by the system of FIG. 1.
Figure 7:
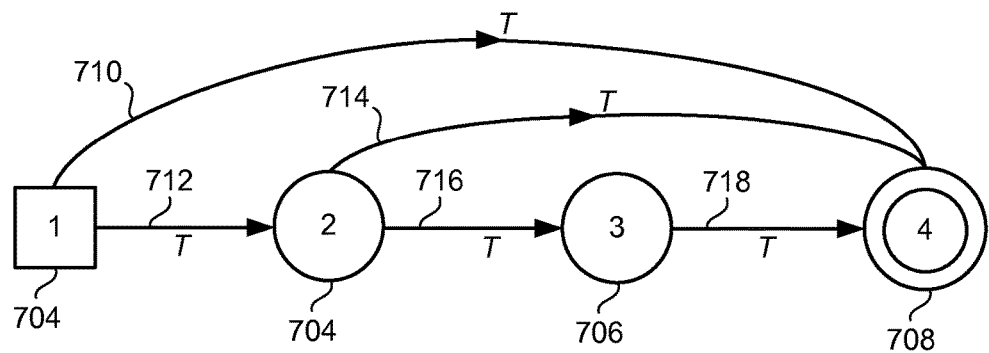
FIG. 7 is a second example finite automaton used by the system of FIG. 1.

FIGS. 6 and 7 provide examples of a first sample finite automaton and a second sample finite automaton that may be used in the system 100 of FIG. 1. For purposes of describing and understanding FIGS. 6 and 7, references made to the routing rules defined with respect to the sample UI screenshot of FIG. 3, in which a plurality of routing rules were received. For sake of convenience, the received routing rules are represented here as Table 1:

TABLE 1

| Rules | Sample transition T |
| --- | --- |
| Capacity Rules | "Load < 20 tons", "length < 40 foot" |
| Compatibility Rules | "Container_type IN food" |
| Gateway Rules | "Gateway_load < 200 tons" |
| Relay Rules | "Segment_number <= 3" |

Thus, in FIG. 6, a start state 602 represents an origin or beginning destination of an asset shipment. A transition T 604 represents a routing rule characterizing a requirement, constraint, or other condition of a transportation of the asset from the location represented by the start state 602. A node 606 represents a finish state, representing a destination or end location of the asset shipment. Transition T 608 is illustrated as both beginning and ending at the state or node 606, in order to thereby represent the fact that there may be a number of intermediate states or nodes within the finite automaton 606, not explicitly illustrated in the simplified example of FIG. 6.

That is, for example, the transition T of FIG. 6 may be understood to correspond to any of the capacity rules, compatibility rules, or gateway rules of table 1. Such rules should be understood to be essentially constant through transitions between intermediate locations (e.g., cities). For example, a total weight or length of a shipment container would not be expected to change as the asset is transported between multiple intermediate cities contained within a single segment of the overall route.

Therefore, in FIG. 6, the node 606 is illustrated with the specialized notation of 2 concentric circles, indicating its status as a finish node, and in contrast to a simple circle, indicating an intermediate location between the square start node 602 and the concentric circles indicating the finish node status of the node 606. By way of further illustration of this example notation, as described in detail below, intermediate nodes 704 and 706 of FIG. 7 are provided. Thus, FIG. 6 should be understood to represent a potential plurality of such intermediate locations, having the start node 602 at one end, and a finish node 606 on the other, and requiring the routing rule corresponding to the transition T between each such pair of locations.

In contrast, FIG. 7 represents the relay rule of Table 1, in which the total number of shipment segments is required to be less than or equal to 3. In order to represent all included possibilities expressed by this rule, i.e., the possibility of having one segment, two segments, or three segments, FIG. 7 illustrates example nodes 702, 704, 706, and 708. As may be appreciated from the arbitrary notational system described above, the square node 702 represents a start state, while the concentric circles of the node 708 indicates a status as a finish node, and intermediate nodes 704, 706, expressed as simple circles, indicate their status as representing intermediate locations within a single segment.

Then, the various transitions 710-718 indicate enforcement of corresponding routing rules, as described above with respect to FIG. 6 and the capacity rules, compatibility rules, and gateway rules. That is, as shown, such routing rules are required through each transition, regardless of the total number of segments used. As may be appreciated from FIG. 7, the transition 710 represents a shipment in which a single segment is used, the transitions 712, 714 represent a shipment in which two segments are used, and transitions 712, 716, 718 represent a shipment in which the maximum number of 3 segments is used.

Thus, in FIGS. 6 and 7 illustrate examples of finite automata, which may be created based on received routing rules, as described. Then, FIGS. 8-12, as described in detail below, illustrate example techniques for combining the resulting finite automata into the single FA network graph. In other words, FIGS. 6 and 7 represent a result of operations of the rule converter 120, while FIGS. 8-12 represent operations of the FA network graph builder 122.

Figure 8:
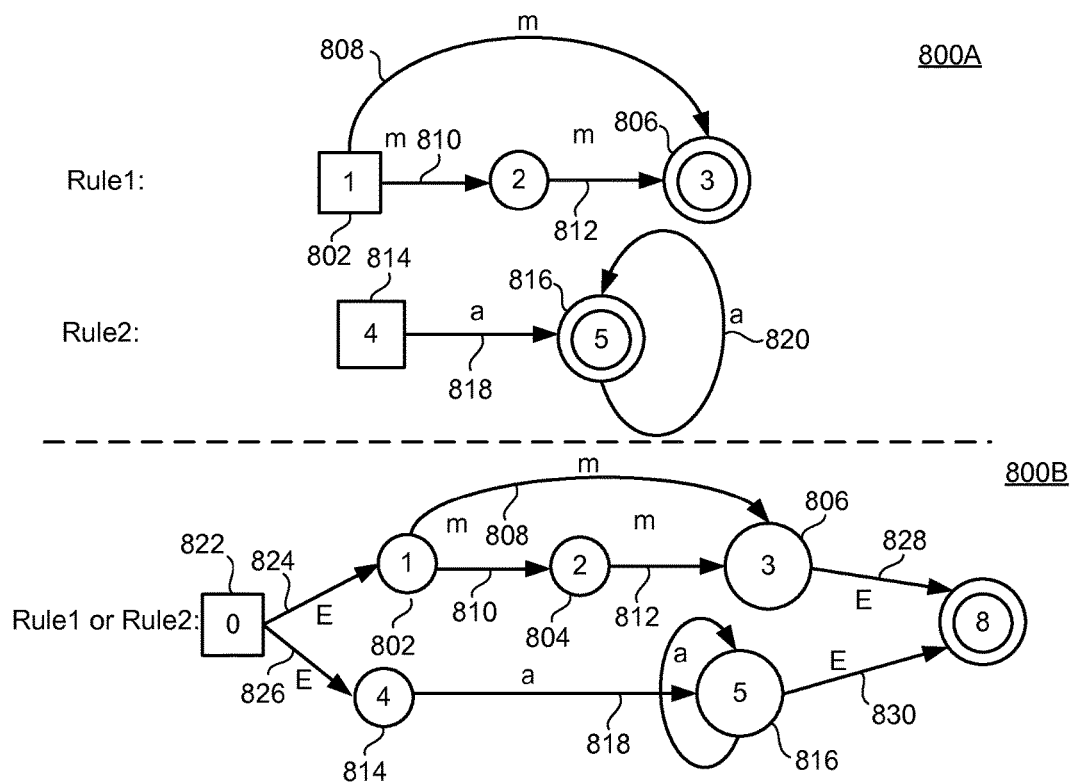
FIG. 8 is an example of an OR operation used to combine two finite automata.

In the example of FIG. 8, portion 800A illustrate two routing rules. In the first routing rule, nodes 802, 804, 806 are connected by transitions 808, 810, 812, as shown. Specifically, as shown, the transitions 808, 810, 812 are associated with a routing rule express the variable quote "m," in having a maximum number of segments less than or equal to 2.

Meanwhile, the second rule is illustrated as including a start node 814 connected to a finish node 816 by way of transitions 818 and 820. As shown, the transitions 818 and 820 are characterized by a routing rule represented as "a."

By way of more specific example, it may occur that the first rule of portion 800A specifies that the shipment type in question may occur by road, where the routing rule represented by "m" imposes a condition on intervening gateway capacities, as described above with respect to gateway rules. In contrast, the second rule may characterize the shipment type as being executed by rail, and having an overall capacity constraint represented by the variable "a."

Thus, the portion 800A represents separate routing rules, either of which would be suitable as a potential physical transportation route. Therefore, portion 800B of FIG. 8 indicates a combination of the two rules of the portion 800A, using an OR operation. Specifically, as shown, a new start state 822 is added prior to each of the original start dates 802, 814, and connected thereto by empty transitions 824, 826, respectively. Similarly, a new finish node 832 is connected after the original finish nodes 806, 816, and connected by empty transitions 828, 830, respectively.

Figure 9:
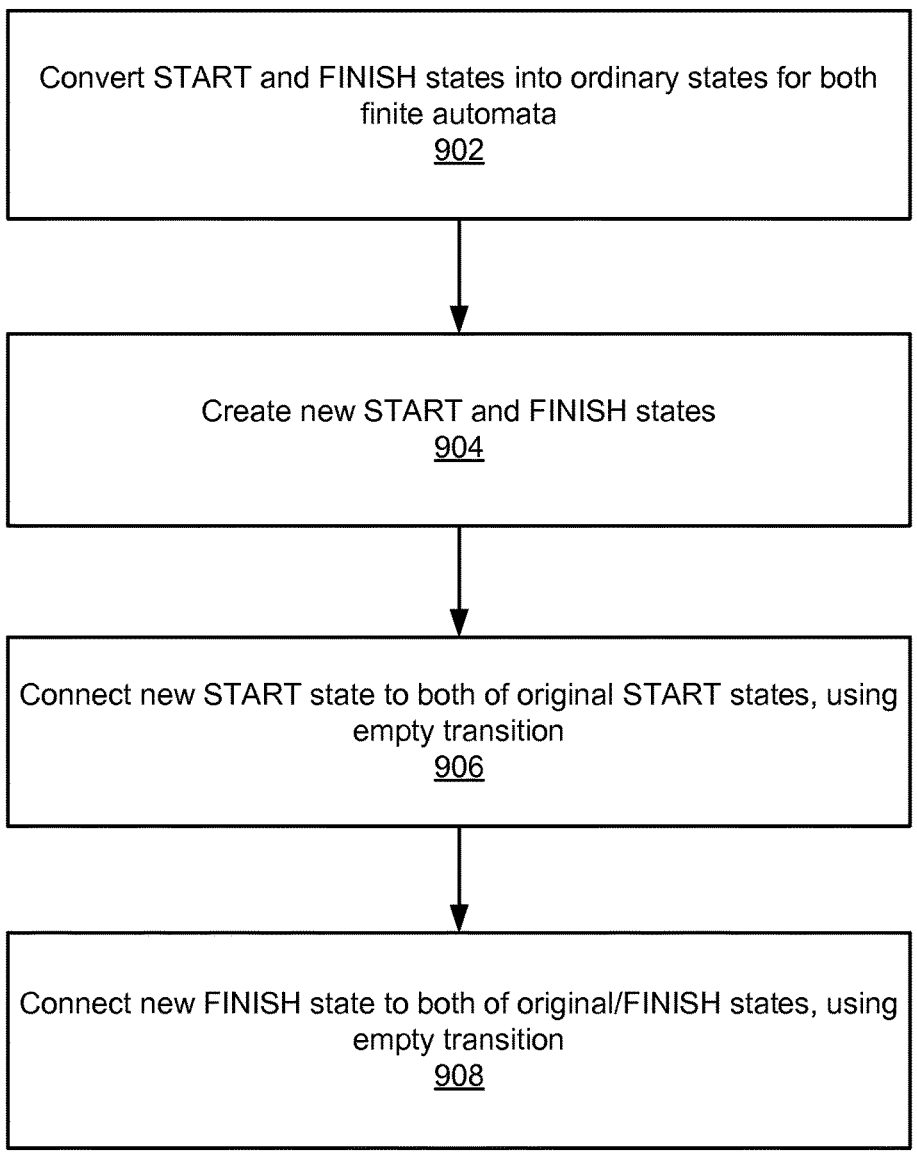
FIG. 9 is a flowchart illustrating example operations for executing the OR operation of FIG. 8.

FIG. 9 is a flowchart 900 illustrating example operations for performing the OR combination of FIG. 8. In the example of FIG. 9, start and finish states are converted into ordinary states for both finite automata being combined (902). For example, in FIG. 8, the various start and finish states 802, 806, 814, 816 may be converted into ordinary states. For example, such states will no longer be considered to be unique in the examples described above.

Instead, new start and finish dates may be generated (904), which will be unique with respect to the new, combined finite automaton. Specifically, as already described, new start 822 and new finish 832 will be unique within the overall combined finite automaton of portion 800B of FIG. 8.

Then, the new start state may be connected to both the original start date, using an empty transition (906), as already described with respect to the transitions 824, 826. Similarly, the new finish state may be connected to both of the original finish states, also using empty transitions (908), as already described with respect to transitions 828, 830.

Figure 10:
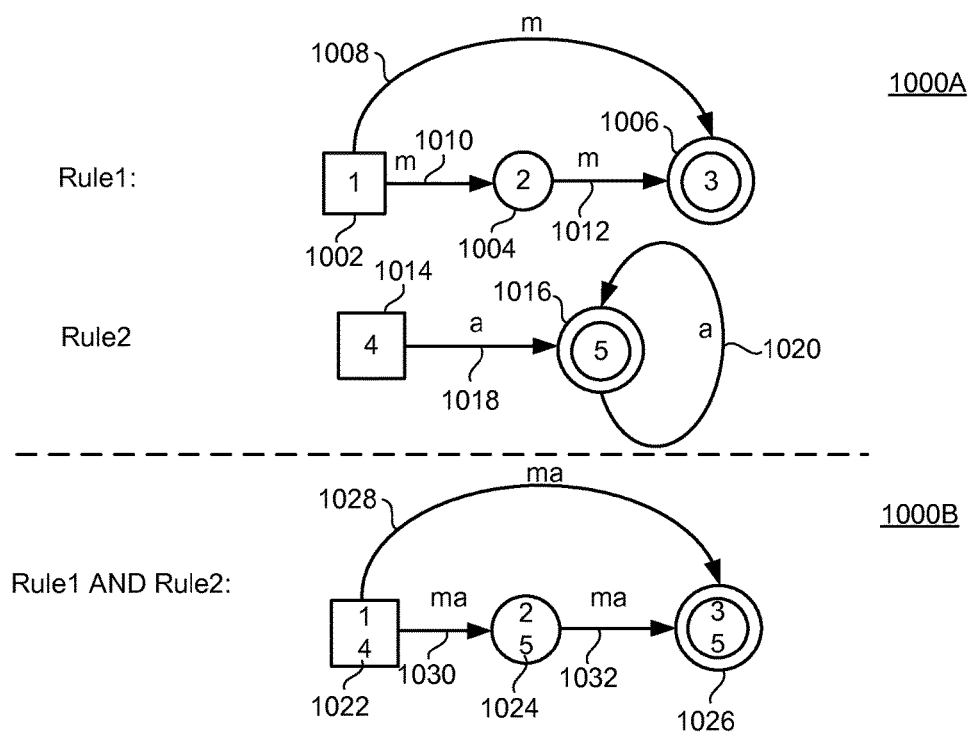
FIG. 10 illustrates an example AND operation for combining two finite automata.

FIG. 10 illustrates another example combination operation that may be performed by the FA network graph builder 122 of FIG. 1. Specifically, as shown, a portion 1000A includes 2 rules, which are combined in the context of an AND operation to obtain the result illustrated in portion 1000B. In the portion 1000A, the rules are essentially identical to the rules already described above with respect to the portion 800A of FIG. 8, but are numbered separately for clarity of reference between FIGS. 8 and 10. Therefore, as shown, a start node 1002 is connected to an intermediate node 1004 by a transition 1010, and the node 1004 is connected to the finish node 1006 by transition 1012. Meanwhile, the start node 1002 is also connected to the finish node 1006 directly by a transition 1008. In the second rule of portion 1000A, a start node 1014 is connected by a transition 1018 to a finish node 1016, which itself has a transition 1020.

In the example of FIG. 10, the first rule is illustrated as including a routing rule characterized by the variable "m," while the second rule is characterized by routing rule represented by the variable "a." As may be appreciated, in contrast to the example of FIG. 8, the variables "m" and "a" in FIG. 10 should be understood to represent routing rules that are designed to be compatible with one another, and are both required for implementation of the shipment type in question. For example, the routing rule "m" may represent a requirement for a food compatibility, while the routing rule represented by "a" may represent an overall maximum capacity.

Thus in the portion 1000B, a combined start node 1022 is connected to a combined start node 1024 by way of a combined transition 1030. The intermediate node 1024 is connected to the combined finish node 1026 by way of the combined transition 1032. Also, the combined start node 1022 is connected to the combined finish node 1026 by the combined transition 1028.

FIG. 10 should be understood to represent a simplified example of an AND combination, provided for the sake of illustration. More detailed example operations, including more complicated scenarios, are provided below with respect to the flowchart 1200 of FIG. 12. For example, in some instances of AND combinations, it may occur that the resulting, combined finite automaton includes nodes and associated transitions that do not reach to the new, combined finish state. Therefore, it may be necessary to inspect the resulting, combined finite automaton, in order to eliminate such nodes and transitions.

Figure 11:
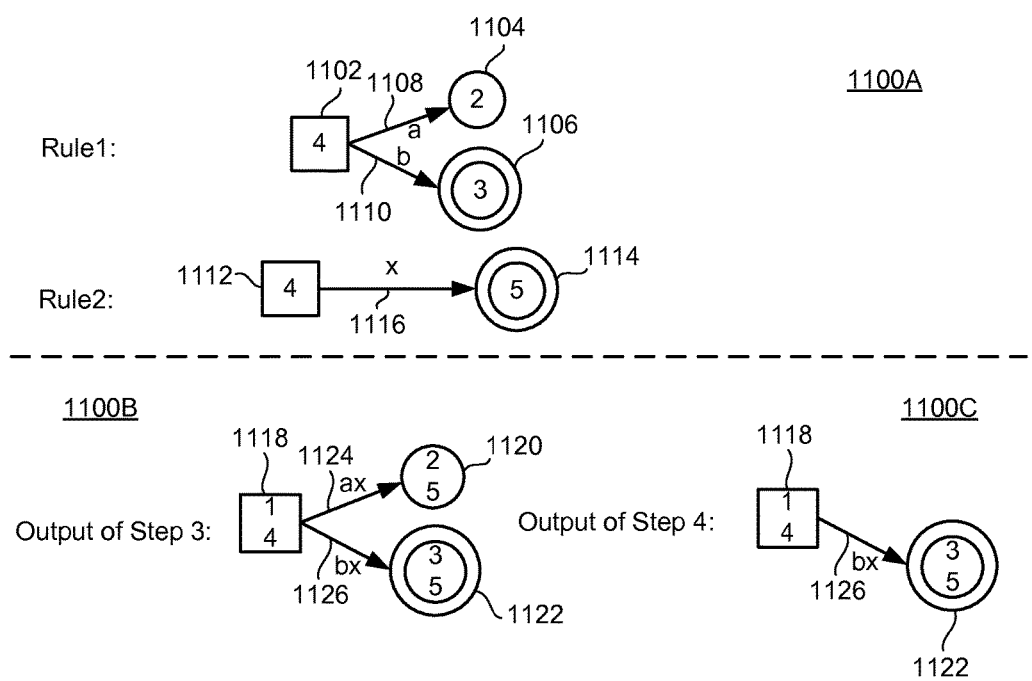
FIG. 11 is a more detailed example operation associated with the AND combination of FIG. 10.

FIG. 11 provides a simplified example of such scenarios. In a portion 1100A, a start node 1102 is connected to a node 1104 by a transition 1108, characterized by routing rule (a). Meanwhile, the start node 1102 is also connected to a finish node 1106 by way of a transition 1110, characterized by a routing rule "b." Meanwhile, in a second rule, a start node 1112 is connected to a finish node 1114 by a transition 1116 that is characterized by routing rule "x."

After an AND operation as described above with respect to FIG. 10, a new, combined start node 1118 is connected to a combined node 1120 by a transition 1124 characterized by a combined routing rule "ax." The new, combined start node 1118 is also connected to the new, combined finish node 1122 by way of transition 1126, characterized by combined routing rule "bx."

As shown, the new, combined node 1120 does not reach the new combined finish node 1122. Therefore, in a portion 1100C, the node 1120 and associated transition 1124 are illustrated as having been removed, leaving only the new start node 1118 being connected to the new finish node 1122 by the transition 1126.

Figure 12:
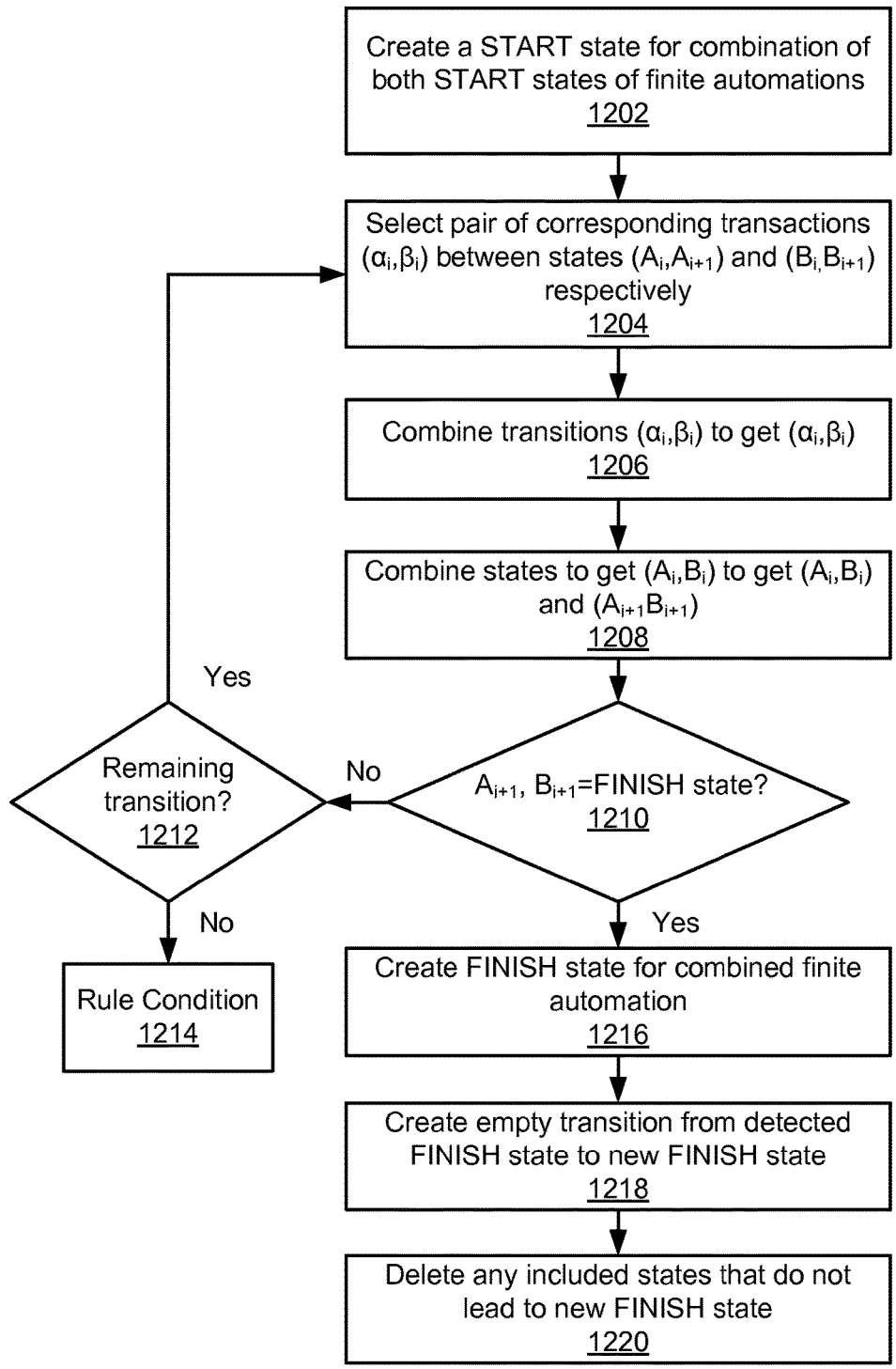
FIG. 12 is a flowchart illustrating more detailed example operations of the AND combination of FIGS. 10 and 11.

FIG. 12 is a flowchart 1200 illustrating more detailed example operations for performing AND combinations of finite automata, in accordance with FIGS. 10 and 11. As shown, operations may begin with the creation of a start state representing a combination of both start states of the finite automata being combined (1202).

Thereafter, a pair of corresponding transitions (alpha$_i$, beta$_i$) between states ($A_i$, $A_i+1$) of the first finite automaton and states ($B_i$, $B_i+1$) of the second finite automaton, respectively (1204). In other words, for any link of a transition alpha that changes rule 1 state from $A_1$ to $A_2$, and any link of transition beta that changes rule 2 to state from $B_1$ to $B_2$, a new normal state $A_2 B_2$ for the new automaton will be created. The new automaton will have a transition of alpha beta from $A_1 B_1$ to state $A_2 B_2$. In this way, as shown in FIG. 12, new, combined transition (alpha$_i$ beta$_i$) (1206). Similarly, corresponding states may be combined to get ($A_i B_i$) and ($A_i+1 B_i+1$) (1208), as described in detail, below.

If the selected states $A_i+1$, $B_i+1$ are not finished states (1210), and if remaining transitions exist (1212), then the next pair of corresponding transitions may be selected (1204). On the other hand, if the states $A_i+1 B_i+1$ are not the finished states of the original automata, and no transitions are remaining (1212), then this result indicates a contradiction in rules (1214), and a corresponding null state may be created.

Otherwise, if both states $A_{i+1}$, $B_{i+1}$ are finish states of the original automata (1210), then a new finish state may be created for the combined finite automaton (1216). An empty transition may be created from the original finish state to the newly created finish state (1218).

Thereafter, as described above with respect to FIG. 11, a DFS may be executed on the resulting automaton, to thereby delete any included states that do not lead to the new finish state (1220). For example, in one implementation, the deep first scan may be executed on the resulting automaton, and all states that lead to the finish state may be marked. Then, during a subsequent DFS on the automaton, all states that are not marked in the previous run will be deleted.

Figure 13:
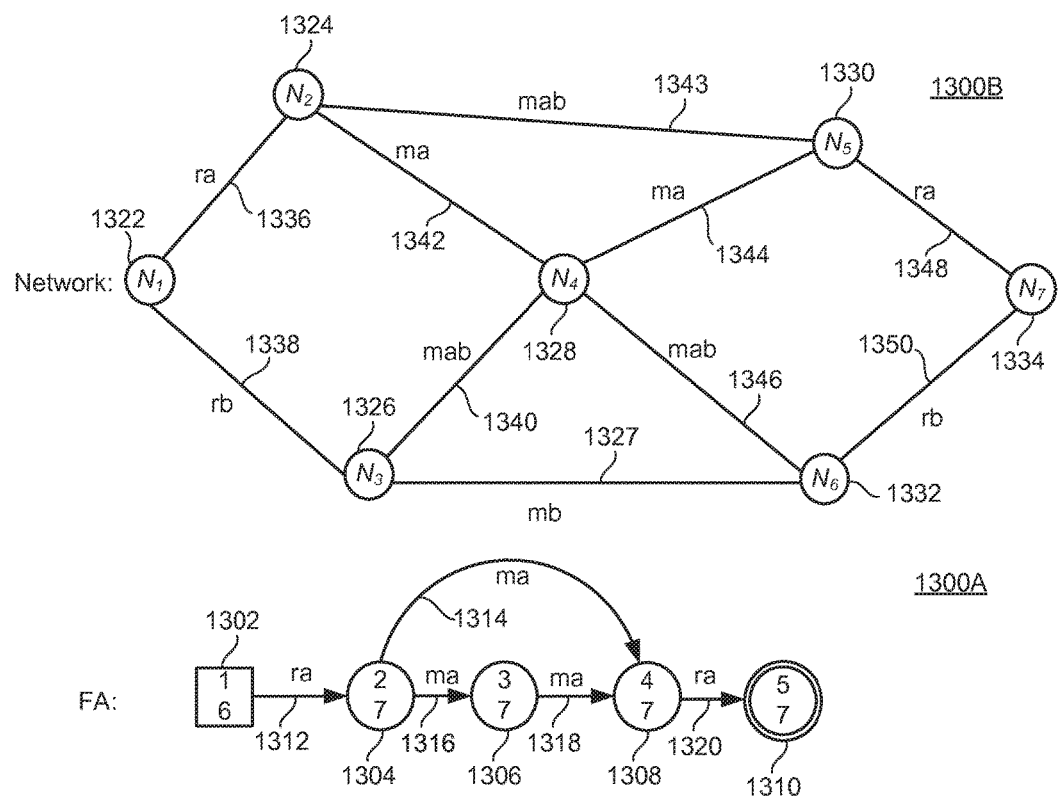
FIG. 13 illustrates an example physical transportation network to be compared against the illustrated combined finite automaton network graph.

FIG. 13 is an illustration of example operations of the route handler 124 and the graph comparator 126 of FIG. 1. Specifically, as shown, in a portion 1300A, a finite network graph is illustrated. The finite graph 1300A should be understood from the above description of FIGS. 6-12 to represent the result of quantifying routing rules, converting the individual routing rules into corresponding finite automata, and then combining the individual finite automata into a single, combined finite automata network graph, using, e.g., the OR operations of FIGS. 8 and 9, the AND operations of FIGS. 10-12, and any other suitable combination techniques.

Thus, in FIG. 13, a combined start node 1302 is connected to a combined intermediate node 1304 by a transition 1312, which is characterized by routing rules expressed using variables "ra." The combined intermediate node 1304 is connected to a subsequent intermediate node 1306 by a transition 1316, characterized by combined routing rules represented as variables "ma." Similarly, the intermediate node 1306 is connected to an intermediate node 1308 by a transition 1318, which is also characterized by combined routing rules represented by variables "ma." The intermediate node 1304 is also connected to the intermediate node 1308 by transition 1314, which again is represented by combined routing rules characterized by variables "ma." Finally for the FA network graph 1300, the intermediate node 1308 is connected to the finish node 1310 by the transition 1320, which is also characterized by combined routing rules represented by variables "ra."

Thus, the FA network graph 1300 represents an example output of the FA network graph builder 122 of FIG. 1. Meanwhile, in portion 1300B of FIG. 13, potential physical transportation paths for a specific shipment instance may be retrieved from the transportation management system 106 by the route handler 124, and expressed as the graphic 1300B. For example, from the above description, it may be appreciated that a start node 1322 may represent a specified or their location for the shipment instance in question, while, similarly, a finish node 1334 represents a destination location (e.g., city). As shown, for this set of potential physical transportation paths for a specified shipment instance, a number of intermediate locations may possibly be used, represented as the various nodes 1324, 1326, 1328, 1330, and 1332. Further, each pair of such nodes is represented by various transitions 1336, 1338, 1340, 1342, 1343, 1344, 1346, 1348, 1350, and 1327. As shown, each such transition is associated with corresponding characteristics, which may be matched to the various variables of the routing rules of the FA network graph 1300A. For example, the transitions 1336 and 1348 are associated with characteristics represented by variables "ra," while the transitions 1342 and 1344 are associated with characteristics matching variables "ma."

In other words, as may be appreciated from the above description of the transportation management system 106, the various routes and paths characterized therein may be characterized according to many different variables that may correspond to variables of the various routing rules. For example, within the transportation management system 106, a given path may be characterized as having food compatible shipment containers available for transport there between, or capability to support shipment capacities up to a certain weight, length, or volume, or any other characterization of an available path between two included locations.

Figure 14:
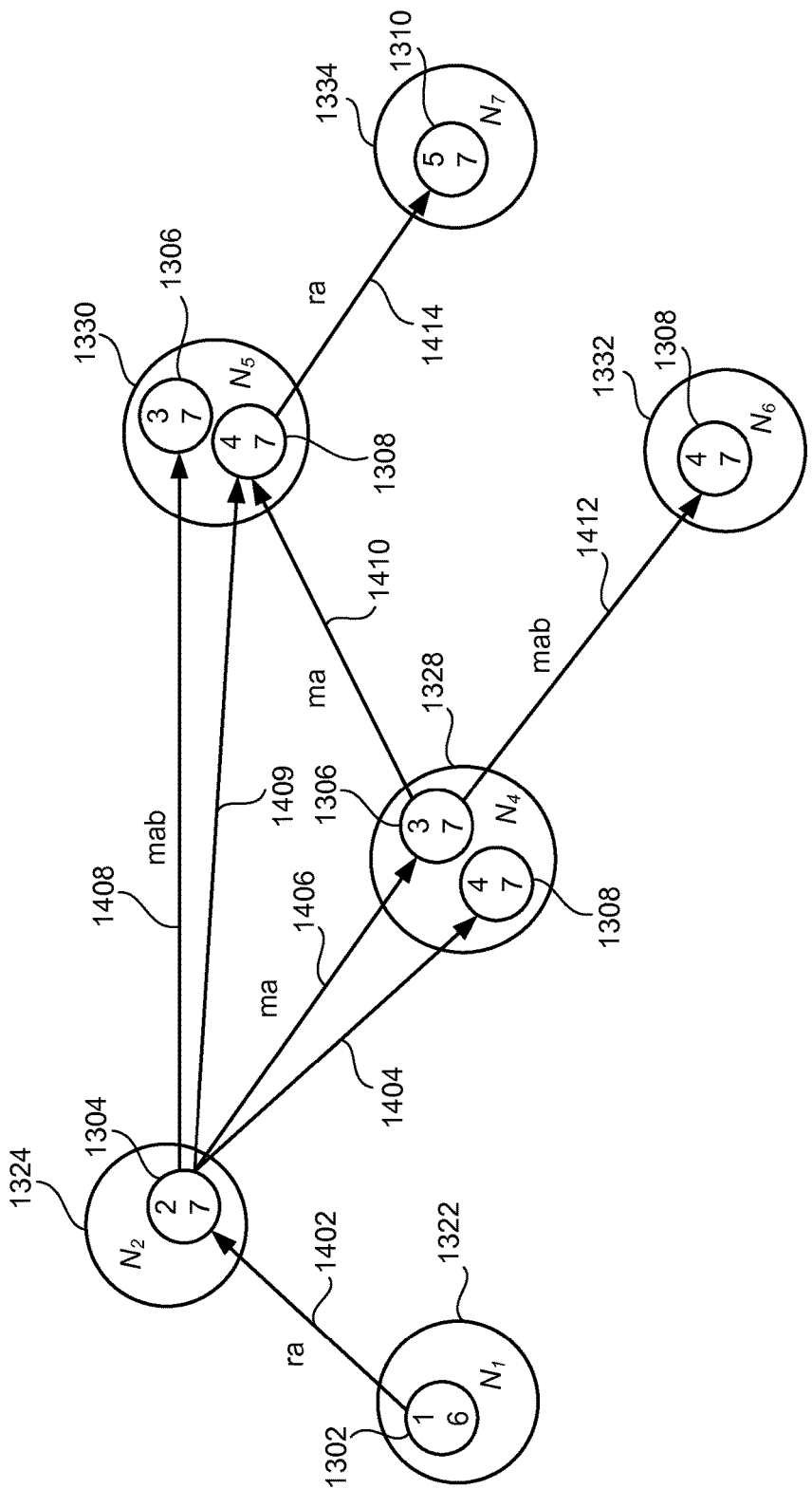
FIG. 14 is a result of the comparison of FIG. 13.

Therefore, after a comparison of the FA network graph 1300A and the available physical transportation paths characterized in the graph 1300B, the graph comparator 126 may provide the combined graph of FIG. 14. In FIG. 14, the various nodes of the graphs 1300A, 1300B are numbered identically to FIG. 13, but may be uniquely identified within FIG. 14 by virtue of their combination with one another. For example, in FIG. 14, the node 1306 is illustrated as possibly being included within either the node 1330, or the node 1328, but may be uniquely identified in the context of each such combination.

Detailed example operations associated with the transformation of FIG. 13 into FIG. 14 are provided below, e.g., with respect to FIGS. 16 and 17. However, from observation of FIGS. 13 and 14, it may be observed that transitions of the graph 1300A, 1300B may be combined, as long as the routing rules characterized within a transition of the FA network graph 1300A are a subset of a corresponding transition of the available physical transportation paths of the graph 1300B. For example, the transition 1312 of 1300A may be combined with the transition 1336 of 1300B, because the variable are identical. Moreover, the transition 1316 of 1300A may be combined with the transition 1343 of 1300B, because the variables "ma" are a subset of the variables "mab."

Moreover, it may further be observed that the available physical transportation paths of 1300B include multiple options for instantiating the FA network graph 1300A. For example, as may be observed from the graph 1300B, transportation from the node 1324 to the node 1330 may occur by way of either the transition 1343, or a combination of the transition 1342, the node 1328, and the transition 1344. Therefore, the transition 1316 of the FA network graph 1300A may be represented multiple times within the combined graph of FIG. 14. That is, as shown, while only a single transition 1402 represents the combination of the transition 1312, 1336 of FIG. 13, a transition 1406 and a transition 1408 both correspond to possible instantiations for the transition 1316 of FIG. 13. Similarly, a transition 1404, and a transition 1409 represent instantiations of the transition 1314 of FIG. 13. Further explanation and examples for obtaining multiple instantiations of the combination and comparison of graph 1300A, 1300B, to thereby take advantage of all available physical transportation paths, is provided below in the context of the flowchart of FIGS. 16 and 17.

Figure 15:
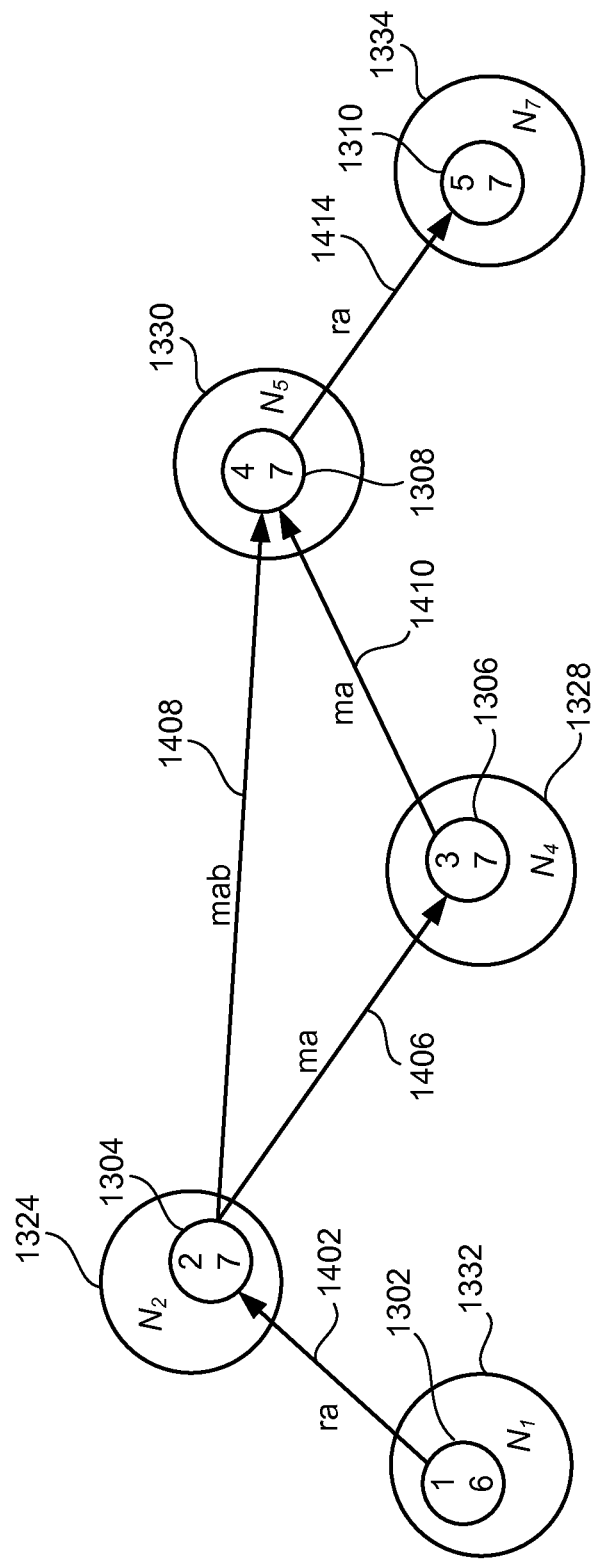
FIG. 15 is a reduced version of FIG. 14, illustrating feasible physical transportation routes.

FIG. 15 illustrates a result of a feasibility check of FIG. 14, and thus represents one or more feasible physical transportation paths that may ultimately be provided by the route selector 128. For example, as shown, the node 1308 within the node 1328 of FIG. 14 is removed, because it does not lead to a finish state. Similarly, the node 1308 within the node 1332 may be removed, and the node 1306 within the node 1330 may be deleted as well.

Figure 16:
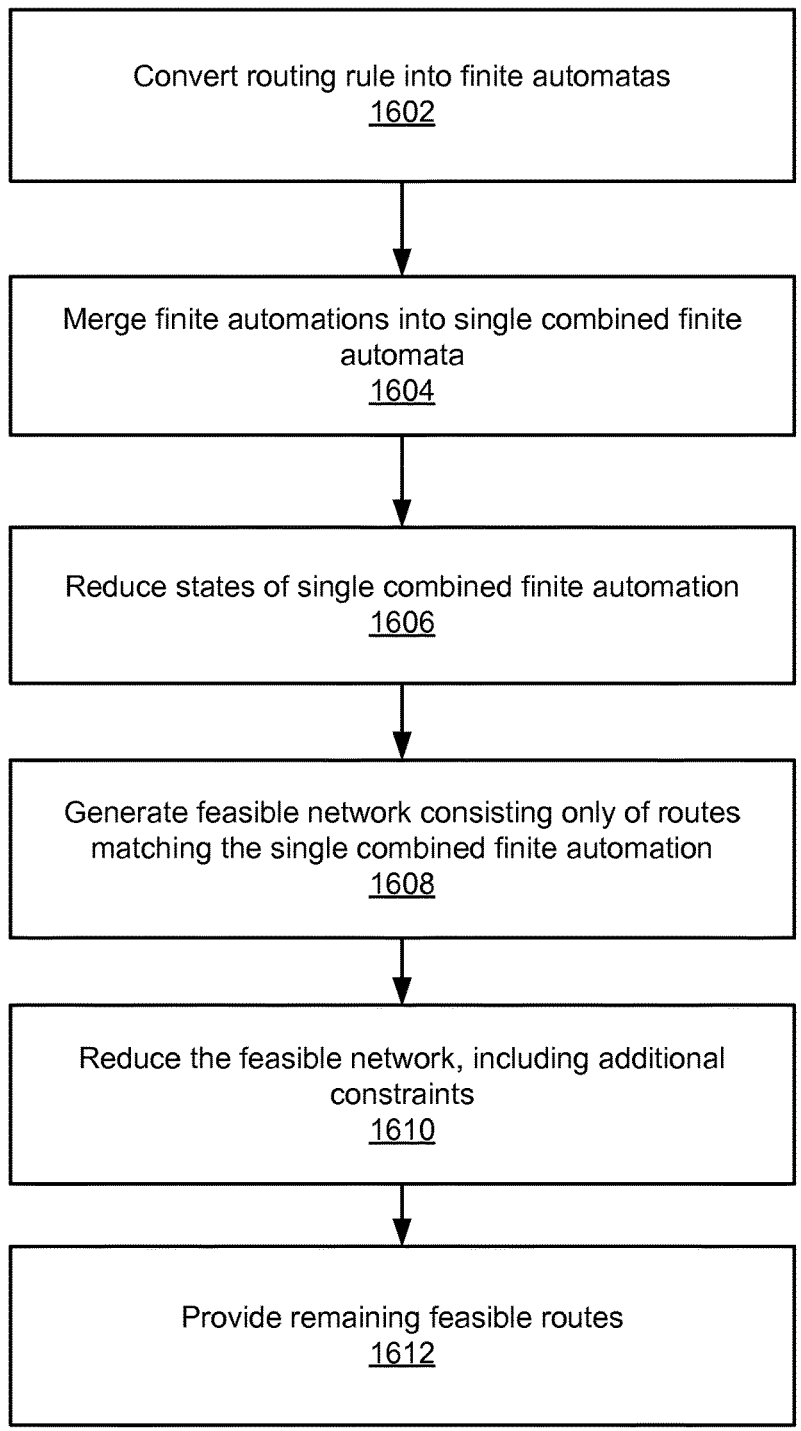
FIG. 16 is a flowchart illustrating example operations associated with FIGS. 13-15.

FIG. 16 is a flowchart 1600 illustrating more detailed example operations of the system 100 of FIG. 1. As shown, and as described above, routing rules may be received and converted into finite automata (1602). The resulting finite automata may be merged or combined into a single finite automaton, referred to herein as the FA network graph (1604). The resulting state of the single combined finite automaton may be reduced (1606). For example, as described, a DFS may be executed to identify any nodes include therein that fail to lead to a unique finish state for the combined finite automaton.

One or more feasible networks may then be generated, including only routes matching the single combined finite automaton, and corresponding to parameters of a specified shipment instance (1608). For example, as described, particular start and end destination cities may be specified and retrieved by the route handler 124, by accessing the transportation management system 106, and the graph comparator 126 may be utilized to compare the resulting, obtained physical transportation routes for the shipment instance with the FA network graph provided by the FA network graph builder 122.

Thereafter, the resulting feasible network may be reduced, including consideration of additional constraints (1610). For example, as just referenced, reduction of a finite automaton may be accomplished by DFS, in order to remove nodes that do not lead to the unique finish state. In additional or alternative implementations, as referenced above with respect to FIG. 5, additional constraints may also be included at this stage to remove otherwise feasible routes that do not comply with the additional constraints.

Finally, the remaining feasible routes may be provided (1610). For example, the route selector 128 may provide the remaining feasible routes by way of the route management UI 104.

Figure 17:
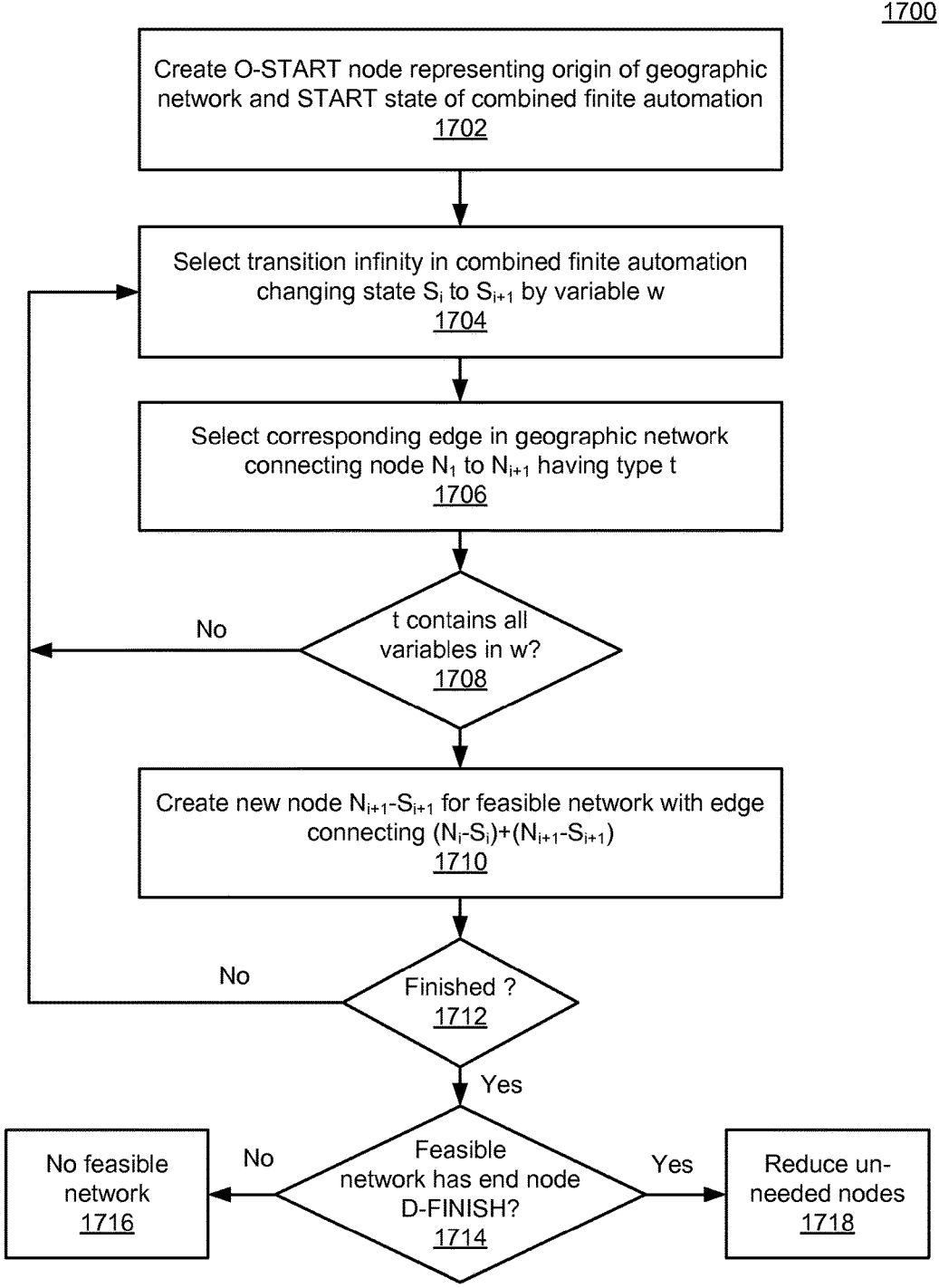
FIG. 17 is a flowchart illustrating more detailed example operations associated with operations for generating the feasible physical transportation network of FIGS. 13-15.

FIG. 17 is a flowchart 1700 illustrating more detailed example operations related to the generation of feasible networks, as described above with respect to operations 1608-1612 of FIG. 16. In the example of FIG. 17, a node O-start may be created that represents an origin location within the obtained geographic network for the shipment instance, as well as the start state of the combined finite automaton (i.e., the FA network graph) (1702). A transition alpha within the combined finite automaton may be selected, the transition alpha changing a state of a first node $S_i$ to a state of a second node $S_{i+1}$ by variable "w." (1704). A corresponding edge within the geographic network connecting node $N_i$ to $N_{i+1}$, and having type "t" may be selected (1706).

If "t" does not contain all variables in "w," (1708), then operations may continue with subsequent selections of a subsequent transition within the combined finite automaton (1704), and selection of a corresponding edge therefore within the geographic network (1706).

Otherwise, a new node $N_{i+1}$ $S_{i+1}$ may be created for the feasible network being created, with an edge connecting $(N_i–S_i)+(N_{i+1}–S_{i+1})$ (1710). If transitions and corresponding edges remain (1712), then operations 1704-1710 may continue. Otherwise, a check may be made as to whether the resulting feasible network has an end node D-finish (1714). If not, then no feasible network exists (1716). Otherwise, operations may continue to reduce any unneeded or unacceptable nodes (1718).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor; and
   instructions recorded on a non-transitory computer-readable medium, and executable by the at least one processor, the system comprising:
   a rule handler configured to receive a first routing rule and a second routing rule through a route management user interface presented at a display device, each routing rule characterizing at least one potential physical transportation route,
   a rule converter configured to convert the first routing rule and the second routing rule received through the route management user interface into a first finite automaton (FA) and a second finite automaton, respectively, and further configured to combine the first finite automaton and the second finite automaton into a finite automaton network graph stored using the non-transitory computer-readable medium, wherein nodes represent potential physical locations and transition edges between the nodes of the finite automaton network graph represent the first routing rule and the second routing rule received through the route management user interface,
   a graph comparator configured to compare the finite automaton network graph to existing physical transportation routes, the existing physical transportation routes represented as geographic network graphs stored using the non-transitory computer-readable medium, wherein the geographic network graphs include transition edges between a plurality of nodes representing physical locations and further wherein the graph comparator is configured to determine whether each transition edge between pairs of nodes of the finite automaton network graph conforms with a corresponding transition edge between pairs of nodes of the geographic network graphs, wherein the graph comparator is further configured to generate a combined graph stored in the non-transitory computer-readable medium, wherein the combined graph represents at least one potential physical transportation route whose transition edges conform to the finite automaton network graph, and the combined graph comprises one or more of the nodes representing potential physical locations of the finite automaton network graph included within one or more of the nodes representing physical locations of the geographic network graphs, and
   a route selector configured to select, based on the comparing, at least one physical transportation route from the existing physical transportation routes, the at least one selected physical transportation route being an instance of the at least one potential physical transportation route, wherein the at least one potential physical transportation route selected by the route selector conforms to the first routing rule and the second routing rule received through the route management user interface and is displayed in the route management user interface for selection.

2. The system of claim 1, wherein the first routing rule and the second routing rule are defined with respect to a shipment type corresponding to anticipated shipments.

3. The system of claim 2, wherein the route selector is further configured to receive a geographical start location and destination location characterizing a shipment instance of the shipment type.

4. The system of claim 3, wherein the existing physical transportation routes are selected from a transportation management system, based on the geographical start location and destination location.

5. The system of claim 1, wherein each of the first finite automaton, the second finite automaton, and the FA network graph each include a unique START state and a unique FINISH state.

6. The system of claim 1, wherein the rule converter is configured to construct the FA network graph independently of potential geographical start and end locations.

7. The system of claim 1, wherein the rule converter is further configured to combine the first and second finite automata using an OR operation.

8. The system of claim 1, wherein the rule converter is further configured to combine the first and second finite automata using an AND operation.

9. The system of claim 1, wherein:
   the system further comprises instructions that, when executed, cause the at least one processor to perform the following:

before selecting the at least one physical transportation route, removing one or more nodes from the finite automaton network graph in the non-transitory computer-readable medium that do not lead to a unique FINISH state.

10. The system of claim 1, wherein:
at least one node representing a potential physical location of the finite automaton network graph is included, in the combined graph, in a plurality of nodes representing different physical locations of the geographic network graphs.

11. The system of claim 1, wherein:
in the combined graph, a node representing a physical location in the geographic network graphs contains one or more nodes representing potential physical locations in the finite automaton network graph.

12. The system of claim 1 wherein:
the system is further configured to recommend a specific physical transportation route from the at least one physical transportation route based on one or more additional constraints that are not characterized by any routing rules included in the finite automaton network graph.

13. A computer-implemented method comprising:
receiving a first routing rule and a second routing rule through a route management user interface, each routing rule characterizing at least one potential physical transportation route;
converting the first routing rule and the second routing rule received through the route management user interface into a first finite automaton and a second finite automaton, respectively;
combining the first finite automaton and the second finite automaton into a finite automaton network graph stored using a non-transitory computer-readable medium, wherein nodes represent potential physical locations and transition edges between the nodes of the finite automaton network graph represent the first routing rule and the second routing rule received through the route management user interface;
comparing the finite automaton network graph to existing physical transportation routes, the existing physical transportation routes represented as geographic network graphs stored using the non-transitory computer-readable medium, wherein the geographic network graphs include transition edges between nodes representing physical locations and further wherein the comparing includes determining whether each transition edge between pairs of nodes of the finite automaton network graph conform with a corresponding transition edge between pairs of nodes of the geographic network graphs;
generating a combined graph stored in the non-transitory computer-readable medium, wherein the combined graph represents at least one potential physical transportation route whose transition edges conform to the finite automaton network graph, and the combined graph comprises one or more of the nodes representing potential physical locations of the finite automaton network graph, and the one or more of the nodes representing potential physical locations of the finite automaton network graph are included within one or more of the nodes representing physical locations of the geographic network graphs; and
selecting, based on the comparing, at least one physical transportation route from the existing physical transportation routes, the at least one selected physical transportation route being an instance of the at least one potential physical transportation route, wherein the selected at least one potential physical transportation route conforms to the first routing rule and the second routing rule received through the route management user interface.

14. The method of claim 13, wherein the first routing rule and the second routing rule are defined with respect to a shipment type corresponding to anticipated shipments.

15. The method of claim 14, wherein the selecting further comprises receiving a geographical start location and destination location characterizing a shipment instance of the shipment type.

16. The method of claim 15, wherein the existing physical transportation routes are selected from a transportation management system, based on the geographical start location and destination location.

17. A computer program product, the computer program product being tangibly embodied on a non-transitory computer-readable medium and comprising instructions that, when executed, are configured to cause at least one processor to:
receive a first routing rule and a second routing rule through a route management user interface, each routing rule characterizing at least one potential physical transportation route;
convert the first routing rule and the second routing rule received through the route management user interface into a first finite automaton and a second finite automaton, respectively;
combine the first finite automaton and the second finite automaton into a finite automaton network graph stored using the non-transitory computer-readable medium, wherein nodes represent potential physical locations and transition edges between the nodes of the finite automaton network graph represent the first routing rule and the second routing rule received through the route management user interface;
compare the finite automaton network graph to existing physical transportation routes, the existing physical transportation routes represented as geographic network graphs stored using the non-transitory computer-readable medium, wherein the geographic network graphs include transition edges between nodes representing physical locations and further wherein the instructions, when executed, are further configured to cause the at least one processor to determine whether each transition edge between pairs of nodes of the finite automaton network graph conform with a corresponding transition edge between pairs of nodes of the geographic network graphs;
generate a combined graph stored in the non-transitory computer-readable medium, wherein the combined graph represents at least one potential physical transportation route whose transition edges conform to the finite automaton network graph, and the combined graph comprises one or more of the nodes representing potential physical locations of the finite automaton network graph, and the one or more of the nodes representing potential physical locations of the finite automaton network graph are included within one or more of the nodes representing physical locations of the geographic network graphs; and
select, based on the comparing, at least one feasible physical transportation route from the existing physical transportation routes, the at least one feasible physical transportation route being an instance of the at least one potential physical transportation route, wherein the selected at least one feasible physical transportation route conforms to the first routing rule and the second routing rule received through the route management user interface;

wherein at least node representing a potential physical location of the finite automaton network graph is included, in the combined graph, in a plurality of nodes representing different physical locations of the geographic network graphs.

18. The computer program product of claim 17, wherein the first routing rule and the second routing rule are defined with respect to a shipment type corresponding to anticipated shipments.

19. The computer program product of claim 18, wherein the instructions, when executed by the at least one processor are further configured to receive a geographical start location and destination location characterizing a shipment instance of the shipment type, and wherein the existing physical transportation routes are selected from a transportation management system, based on the geographical start location and destination location.

20. The computer program product of claim 19, wherein the instructions, when executed by the at least one processor are further configured to construct the FA network graph independently of potential geographical start and end locations.

* * * * *